INVENTOR.
LEIGHTON L. MORSE

United States Patent Office 3,267,416
Patented August 16, 1966

3,267,416
ICE PROFILING SONAR SYSTEM
Leighton L. Morse, San Diego, Calif., assignor to the United States of America as represented by the Secretary of the Navy
Filed Feb. 25, 1964, Ser. No. 347,317
2 Claims. (Cl. 340—3)

The invention described herein may be manufactured and used by or for the Government of the United States of America for governmental purposes without the payment of any royalties thereon or therefor.

This invention relates to sonar systems and is particularly directed to navigation aids for submarines under the ice cover of the arctic regions.

With the increased interest in submarine operation in the arctic and the demonstrated feasibility of surfacing through the arctic ice pack, there is a very definite need for improved systems to aid the submarine in detecting the overhead ice cover, checking its extent, and most importantly, measuring its thickness accurately before attempting to break through.

Present systems have proved useful in charting the gross extent of the ice cover and as an aid in selecting a likely spot for surfacing. However, it has been demonstrated that the recorded data often shows serious ambiguities as to the presence of ice overhead. Then to complicate the problem, if an ice cover is indicated its thickness is not known with sufficient accuracy to determine whether it is too thick for an attempted breakthrough or how much force should be used in an attempt to surface. It is important to know, first, if there is an ice cover and second, whether it is thin enough to warrant surfacing procedures.

In ice thickness measurements a reference plane or bench mark is required. With some sonar systems the echo return from open water could provide the necessary reference, but areas of open water are often scarce in the Arctic Ocean and during winter are practically nonexistent. With more recent systems, the submarine depth meter is used to establish the reference plane. However, with this arrangement errors creep in which restrict the accuracy of ice thickness measurements to plus or minus three feet. Such error cannot be tolerated in surfacing procedures.

The object of this invention is to provide an improved ice profiling sonar system.

The object of this invention is attained by employing two frequencies in a double sonar system. According to an important feature of this invention it is recognized that frequencies in the low range will recognize the ice-to-air interface while frequencies in the high sonar range will recognize only ice-to-water interfaces. According to this invention sonar pulses of the high and low frequencies are simultaneously transmitted upwardly toward the underside of the ice pack. The high frequency signals are substantially reflected from the underside of the ice at the ice-water interface. The lower frequencies, however, do not recognize the ice-water interface but travel upwardly through the ice and are substantially reflected only from the ice-to-air interface. Tuned circuits effectively separate the differently reflected echoes and route the two signals to separate recording styli, or other indicator devices. The differences in sonar range as indicated by the received echo signals show the difference in elevation between the upper and lower surfaces of the ice pack and hence accurately indicate the thickness of the ice.

Other objects and features of this invention will become apparent to those skilled in the art by referring to the preferred embodiments described in the following specification and shown in the accompanying drawing in which.

Figure 1:
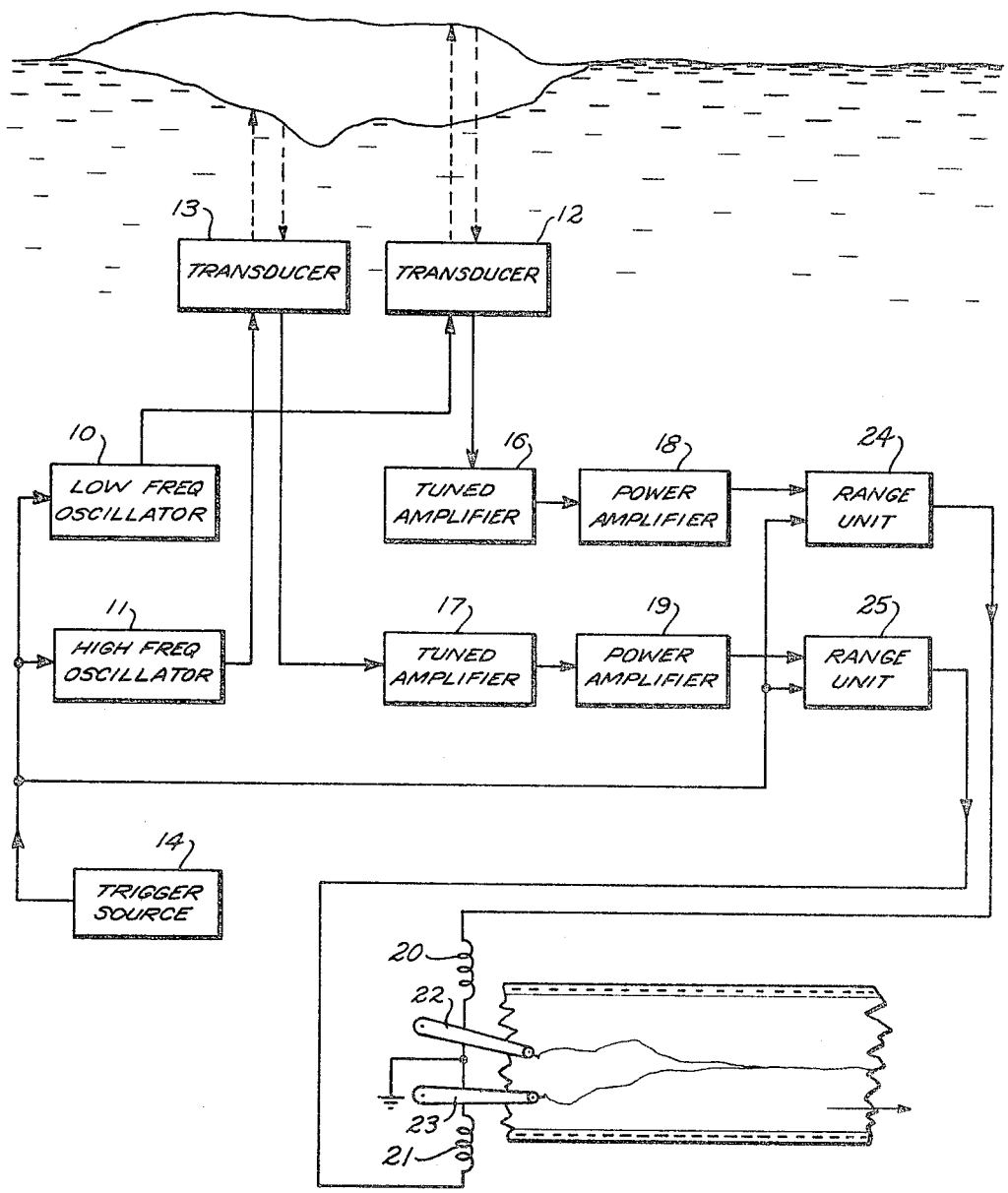
FIG. 1 is a block diagram of the principal features of one embodiment of this invention.

In FIG. 1, the submarine-carried sonar system comprises the low frequency oscillator 10 and the high frequency oscillator 11 connected, respectively, to the transducers 12 and 13. Both oscillators are simultaneously triggered by the trigger source 14. The transmitters are adapted, as usual, to ensonify the sea of the surrounding area and to project, in this case, some acoustical waves upwardly toward the ice or open water overhead. The frequency of the oscillator 10 is preferably in the 5 to 15 kc. range while the frequency of oscillator 11 is higher by two or more orders of magnitude. The frequency of the oscillator 11 may, for example, be in the 50 to 100 kc. range, if the so-called low frequency is in the 5 to 15 kc. range.

The transducers 12 and 13 project the sound waves upwardly and receive all echo signals in return. The received echo signals of transducers 12 and of 13 are, respectively, passed by tuned amplifiers 16 and 17. The pass band of the amplifiers 16 and 17 correspond to the frequency ranges of the oscillators 10 and 11. The output signals of amplifier 16 and 17 are, respectively, amplified in power amplifiers 18 and 19 and applied to the range units 24 and 25 and, in the specific example shown, to the deflection coils 20 and 21 of the tracing styli 22 and 23.

In operation, a substantially higher frequency signal of transducer 13 is returned from the water-ice interface. There will be a relatively strong echo with a minimum of penetration although there will be some scattering of the signal because of surface irregularities of the ice. On the other hand, the lower frequency signal penetrates the ice and returns a relatively strong echo signal from the ice-air interface accompanied by a volume scattering effect. By separately treating the two signals the pen recorder will trace a continuous plot of both top and bottom profiles of the ice cover. As the ice becomes thicker there is more chance for loss of signals from the upper surface of the ice but in this case the accuracy of thickness measurement becomes less important. It is assumed that in the case of the ice-water interface the boundary is less obvious to the sound waves. The difference in density between the ice and the water on the other hand is slight, and requires the higher frequency to produce a useable echo. Practically any frequency of sonar signal will adequately detect the air-water interface.

Many indicating and/or recording devices may be employed. In FIG. 1, for example, range units 24 and 25 are connected, respectively, to the high frequency and the low frequency channels of the ice profiling system. Conveniently, the range units may each comprise an integrator which will start integrating the signal at the instant of the trigger pulse from source 14. The amplitude of the voltage at the output of the range unit may then be made proportional to the range or time delay introduced by the sound waves at the transducers. This amplitued may operate against a bias spring on the styli arms for tracing the top and bottom of surfaces of the ice layer. Since we are interested only in ice thickness, the position on the recording tape is of relatively little importance. Fortunately, ice thickness is a function only of difference in transit time of the two acoustic waves to the underside and to the topside of the ice layer that the absolute depth of the submarine below sea level is canceled out and becomes unimportant.

Where ice thickness information only is desired, as part of a surfacing maneuver, it is possible to combine additively the outputs of the range units 24 and 25 so as to produce in a conventional indicating instrument, a needle deflection proportional to the difference between the two ranges and to calibrate the meter in terms of inches and feet of ice thickness.

Figure 2:
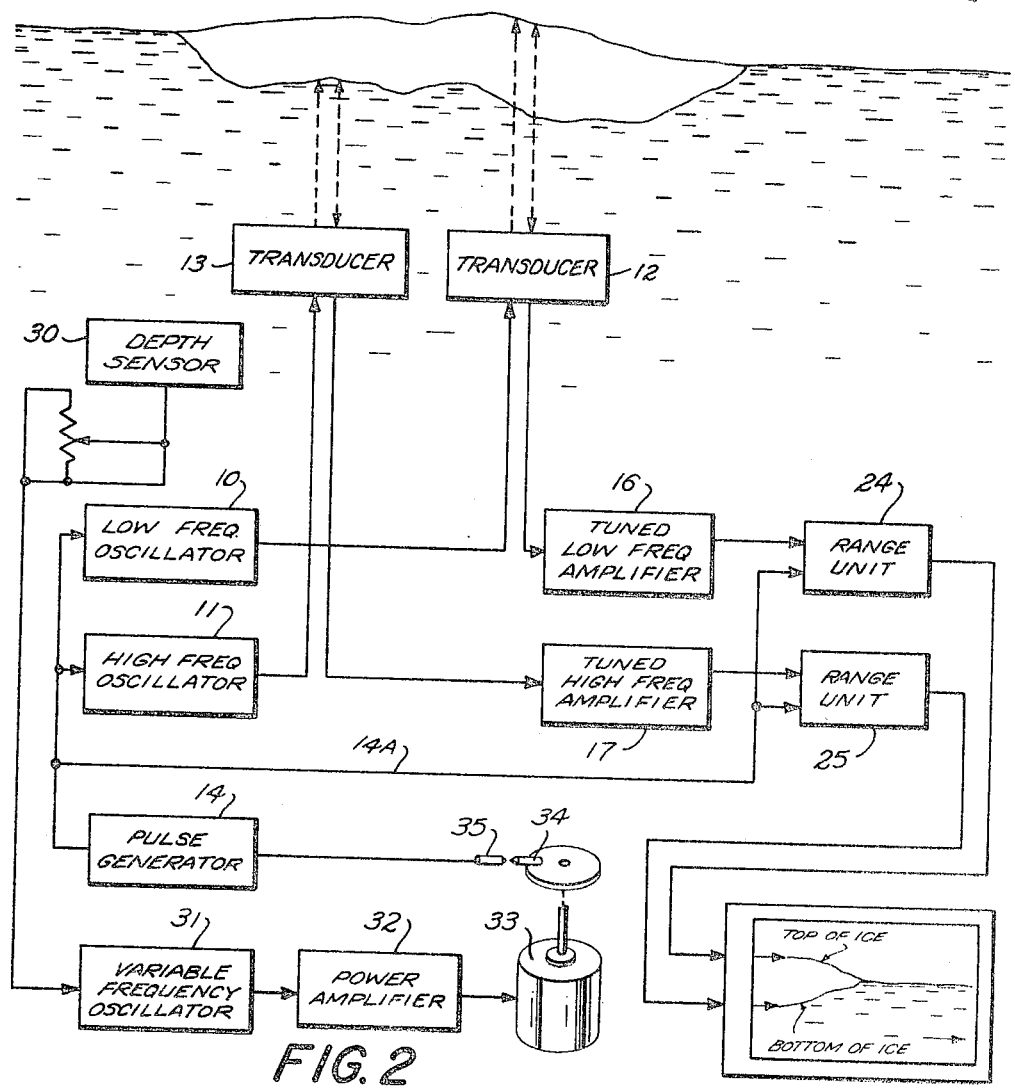
FIG. 2 is a block diagram of another system according to this invention.

An alternative system embodying the principles of FIG. 1 is shown in FIG. 2. Here the transducers 12 and 13 are pulsed simultaneously but at a rate dependent on the depth of the submarine. This allows maximum sampling rate for a given depth and provides a very high sampling rate as the range becomes short, as desired.

In FIG. 2, the high frequency signal is returned from the water-ice interface and the low frequency signal returned from the air-ice interface. The frequency-selected signals are fed into the range units 24 and 25, respectively. In the preferred embodiment, the range units each comprise a bistable flip-flop in which the initial pulse of generator 14 sets the flip-flop and turns on a current and the echo resets the flip-flop and turns off the same current. These output current pulses from each flip-flop range unit are fed into separate inputs of a dual channel recorder of long time constant so that the current pulses may be integrated and produce a certain pen displacement. Now, an open water situation would mean simply equal path lengths for each signal and therefore both recorder traces would be superimposed. With ice cover present the low frequency signal path would be longer and likewise the current pulse from the range unit would be longer producing pen deflection and therefore tracing the upper surface of the ice. At the same time the high frequency signal path would produce shorter current pulses out of the range unit with resulting less pen amplitude and tracing profile of the underside of the ice.

Figure 3:
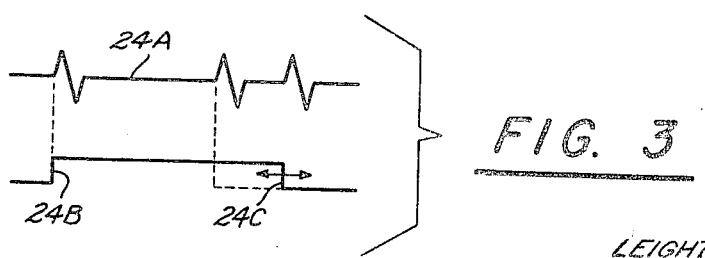
FIG. 3 is a diagram of principal range-measuring voltages of this invention.

If the input to the flip-flop 24 via lines 14a is as shown at 24a in FIG. 3, the flip-flop will turn on or set, as shown at 24b. Then, the first pulses received from the transducer will turn off or reset the flip-flop as shown at 24c. The output of the flip-flop will be a rectangular wave with the length of the wave being a direct function of the range of the transducer to the reflecting interfaces.

In the specific example of FIG. 2 the depth sensor 30 is employed to vary the pulse repetition rate of the system. The sensor 30 is coupled to the frequency determining elements of the variable frequency oscillator 31 so that the frequency of oscillation may become a direct function of the hydrostatic pressure sensor i.e. depth sensor 30. The output of the oscillator 31 is amplified at 32 and applied to the variable speed synchronous motor 33. The rotating magnet 34 will induce a voltage in the magnetic pickup coil 35 to trigger the pulse generator 14. It is apparent that the pulse for the sonar system may be calibrated in terms of the depth of the submarine.

Figure 4:
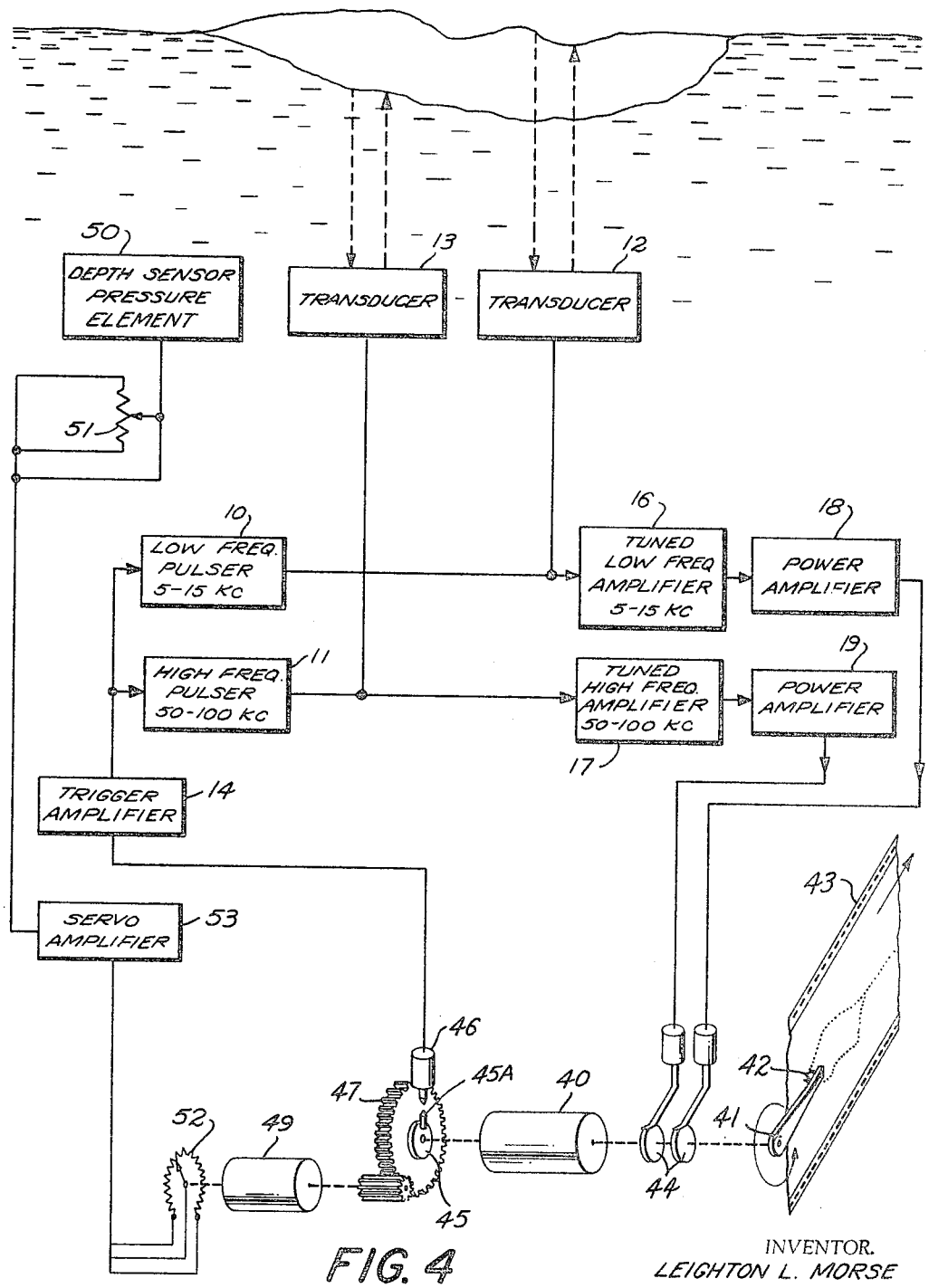
FIG. 4 is a block diagram of still another system embodying the features of this invention.

FIG. 4 shows the system of this invention with an alternative technique for deriving the time base for the sonal signals and for indicating and recording those signals in terms of distance. The constant speed synchronous motor 40 drives the arm 41 at a constant speed. Closely spaced styli 42 at the end of the arm 41 travel at a constant speed on the periphery of the circle inscribed on the arm. The paper of the recording tape 43, in this embodiment, is electrosensitive so that it will discolor under the influence of a high voltage field at the tip of each stylus. The paper travels from left to right at a constant speed from one spool to another. Sonar echo pulses received by the transducers 12 and 13 are selectively amplified by the tuned amplifiers 16 and 17, are amplified in power amplifiers 18 and 19, and are applied, respectively, through slip rings 44 to the two styli 42.

The synchronous motor 40 also drives the disc 45 which carries the magnet 45a. Each time the magnet rotates the magnet pickup coil 46, a pulse is generated which, through the trigger amplifier 14, triggers pulses in the low and high frequency pulsers 10 and 11.

According to this invention the position of the magnetic pickup coil 46 with respect to the rotating magnet is varied by the pressure sensor element 50. In the specific embodiment shown, the pickup coil is mounted upon the ring gear 47 which is, in turn, driven by pinion 48 and hence by servo motor 49. The potentiometers 51 and 52 are in a conventional balanced bridge arrangement which, with servo amplifier 53, causes the servo motor to travel in either direction in response to movement of the moving element of the depth sensor pressure element 50. As the pressure changes with up and down maneuvers of the submarine, the magnetic pickup coil advances or retreats to change the phase relation of the trigger pulse with respect to the movement of the styli arm 41 so as to keep the recording datum line in the center of the recording paper regardless of submarine depth.

Many modifications may be made in this system of this invention without departing from the scope of the invention as defined in the appended claims.

What is claimed is:
1. A system for measuring the thickness of sea-ice and graphing the profile of the ice comprising,
   means for simultaneously projecting two sonic waves upward toward said ice, said two waves being differently responsive to the water-ice and the air-ice interfaces,
   two transducers for receiving echo signals from said interfaces,
   two tuned amplifiers tuned, respectively, to said two waves, and coupler, respectively, to said two transducers,
   separate range units connected to the outputs of each amplifier,
   separate recording styli connected, respectively, to the outputs of said range units, and
   a common recording tape for the two styli.
2. A system for measuring ice thickness comprising,
   a low frequency oscillator,
   a high frequency oscillator, a pulse generator coupled in multiple to said oscillators to simultaneously pulse said oscillators,
   means responsive to the depth and hydrostatic pressure of said system,
   a variable frequency oscillator responsive to said depth means,
   a variable speed synchronous motor,
   magnetic pickup means responsive to said motor for controlling the frequency of said pulse generator so that the pulse rate of said oscillators is a function of depth, transducers coupled to the output of said oscillators, tuned amplifiers coupled to the output of said transducers and range measuring units coupled to the outputs of said amplifiers.

References Cited by the Examiner
UNITED STATES PATENTS
3,094,681   6/1963   Kietz et al. _____ 340—3

OTHER REFERENCES
"Sonar Guides Submarine Under Polar Ice," Electronics, vol. 34, No. 12, March 24, 1962, pages 18 and 19 relied on.

CHESTER L. JUSTUS, *Primary Examiner.*

R. A. FARLEY, *Assistant Examiner.*